United States Patent

Zhu

[11] Patent Number: 6,154,780
[45] Date of Patent: Nov. 28, 2000

[54] METHOD AND APPARATUS FOR TRANSMISSION OF A FLEXIBLE AND ERROR RESILIENT VIDEO BITSTREAM

[75] Inventor: Chunrong Zhu, Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/769,067

[22] Filed: Dec. 18, 1996

[51] Int. Cl.$^7$ .............................. G06F 15/16; H04N 7/00
[52] U.S. Cl. .................... 709/236; 709/230; 709/231; 709/232; 348/426
[58] Field of Search ............................ 395/200.32, 200.6, 395/200.61, 200.66, 200.77; 382/236, 232; 358/133, 141; 348/467, 426, 845.2, 384, 390, 400, 405, 409, 420, 699; 709/202, 230, 231, 232, 233, 236

[56] References Cited

U.S. PATENT DOCUMENTS

| | | | |
|---|---|---|---|
| 5,168,356 | 12/1992 | Acampora et al. ...................... | 348/409 |
| 5,365,272 | 11/1994 | Siracusa et al. ........................ | 348/426 |
| 5,371,547 | 12/1994 | Siracusa et al. ........................ | 348/426 |
| 5,398,072 | 3/1995 | Auld ...................................... | 348/426 |
| 5,493,514 | 2/1996 | Keith et al. .......................... | 364/514 R |
| 5,610,660 | 3/1997 | Hamano et al. ....................... | 348/423 |
| 5,764,802 | 6/1998 | Simon .................................... | 382/236 |
| 5,786,858 | 7/1998 | Yagasaki et al. ...................... | 348/415 |
| 5,835,144 | 11/1998 | Matsumura et al. ................... | 348/390 |
| 5,838,265 | 11/1998 | Adolph ................................... | 341/50 |
| 5,867,231 | 2/1999 | Wada et al. .......................... | 348/845.1 |

OTHER PUBLICATIONS

International Telecommunication Union, ITU–T Recommendation H.261, "Line Transmission of Non–Telephone Signals", Mar. 1993, 28 pages.

J.L. Mitchell, W.B. Pennebaker, C.E. Fogg, D.J. LeGall, "Overview of MPEG", MPEG Video Compression Standard, Chapter 2, pp. 17–32.

J.L. Mitchell, W.B. Pennebaker, C.E. Fogg, D.J. LeGall, "MPEG–2 Overview", MPEG Video Compression Standard, Chapter 9, pp. 171–186.

J.L. Mitchell, W.B. Pennebaker, C.E. Fogg, D.J. LeGall, "MPEG–2 Main Profile Syntax", MPEG Video Compression Standard, Chapter 10, pp. 187–236.

Internet Engineering Task Force, Internet–Draft, *RTP payload for H.263 Video Stream*, Nov. 25, 1996, pp. 1–11.

ITU–T Recommendation H.263 *Video Coding For Low Bit Rate Communication*, Mar. 1996, pp. 1–44.

*Primary Examiner*—Mark H. Rinehart
*Assistant Examiner*—Quoc-Khanh Le
*Attorney, Agent, or Firm*—Blakely, Sokoloff, Taylor & Zafman LLP

[57] ABSTRACT

A method and apparatus for transmitting a video bitstream over a communication medium is provided. The video bitstream is carried as payload data within packets of a transport protocol by dynamically determining whether to fragment the video bitstream at current macroblock. If no determination of fragmentation occurs, based upon the maximum transfer unit size of the transport protocol, the current macroblock is transmitted in a current transport protocol packet. However, if a determination of fragmentation occurs, synchronization information and the current macroblock are transmitted in another transport protocol packet. Permitting dynamic insertion of synchronization information, gives rise to a flexible video bitstream that can be efficiently packetized for a variety of transport protocols.

6 Claims, 9 Drawing Sheets

FIG. 1
PRIOR ART

| | | | | | | | | |
|---|---|---|---|---|---|---|---|---|
| GOB$_0$ 210 | GOB HEADER$_0$ | MB$_0$ | MB$_1$ | MB$_2$ | · · · | MB$_8$ | MB$_9$ | MB$_{10}$ |
| GOB$_1$ 220 | GOB HEADER$_1$ | MB$_{11}$ | MB$_{12}$ | MB$_{13}$ | · · · | MB$_{19}$ | MB$_{20}$ | MB$_{21}$ |
| GOB$_2$ 230 | GOB HEADER$_2$ | MB$_{22}$ | MB$_{23}$ | MB$_{24}$ | · · · | MB$_{30}$ | MB$_{31}$ | MB$_{32}$ |
| GOB$_3$ 240 | GOB HEADER$_3$ | MB$_{33}$ | MB$_{34}$ | MB$_{35}$ | · · · | MB$_{41}$ | MB$_{42}$ | MB$_{43}$ |
| GOB$_4$ 250 | GOB HEADER$_4$ | MB$_{44}$ | MB$_{45}$ | MB$_{46}$ | · · · | MB$_{52}$ | MB$_{53}$ | MB$_{54}$ |
| GOB$_5$ 260 | GOB HEADER$_5$ | MB$_{55}$ | MB$_{56}$ | MB$_{57}$ | · · · | MB$_{63}$ | MB$_{64}$ | MB$_{65}$ |
| GOB$_6$ 270 | GOB HEADER$_6$ | MB$_{66}$ | MB$_{67}$ | MB$_{68}$ | · · · | MB$_{74}$ | MB$_{75}$ | MB$_{76}$ |
| GOB$_7$ 280 | GOB HEADER$_7$ | MB$_{77}$ | MB$_{78}$ | MB$_{79}$ | · · · | MB$_{85}$ | MB$_{86}$ | MB$_{87}$ |
| GOB$_8$ 290 | GOB HEADER$_8$ | MB$_{88}$ | MB$_{89}$ | MB$_{90}$ | · · · | MB$_{96}$ | MB$_{97}$ | MB$_{98}$ |

QCIF PICTURE FORMAT

METHOD AND APPARATUS FOR TRANSMISSION OF A FLEXIBLE AND ERROR RESILIENT VIDEO BITSTREAM

FIELD OF THE INVENTION

The invention relates generally to the field of video signal processing. More specifically, the invention relates to the real-time transmission of coded digital video signals and segmentation of a digital video bitstream into transport protocol packets.

BACKGROUND OF THE INVENTION

Transmission of encoded digital video data from one computer system over a communication medium to another computer system typically involves carrying the video bitstream as payload data within the payload of transport protocol packets. This process of inserting data into another protocol's packet is generally referred to as "encapsulation." While this process of encapsulation adds overhead, it provides a method of transmitting data from one location to another over an intermediate communication medium. The process of dividing the input bitstream among the transport protocol packets is referred to as "segmentation." Generally, encapsulation involves "segmentation" of the bitstream at the source into packets and reassembling the bitstream at the destination. For example, a prior encapsulation approach is described with reference to FIG. 2B and FIG. 3. Likewise, the video bitstream format is described with reference to FIG. 1.

Figure 1:
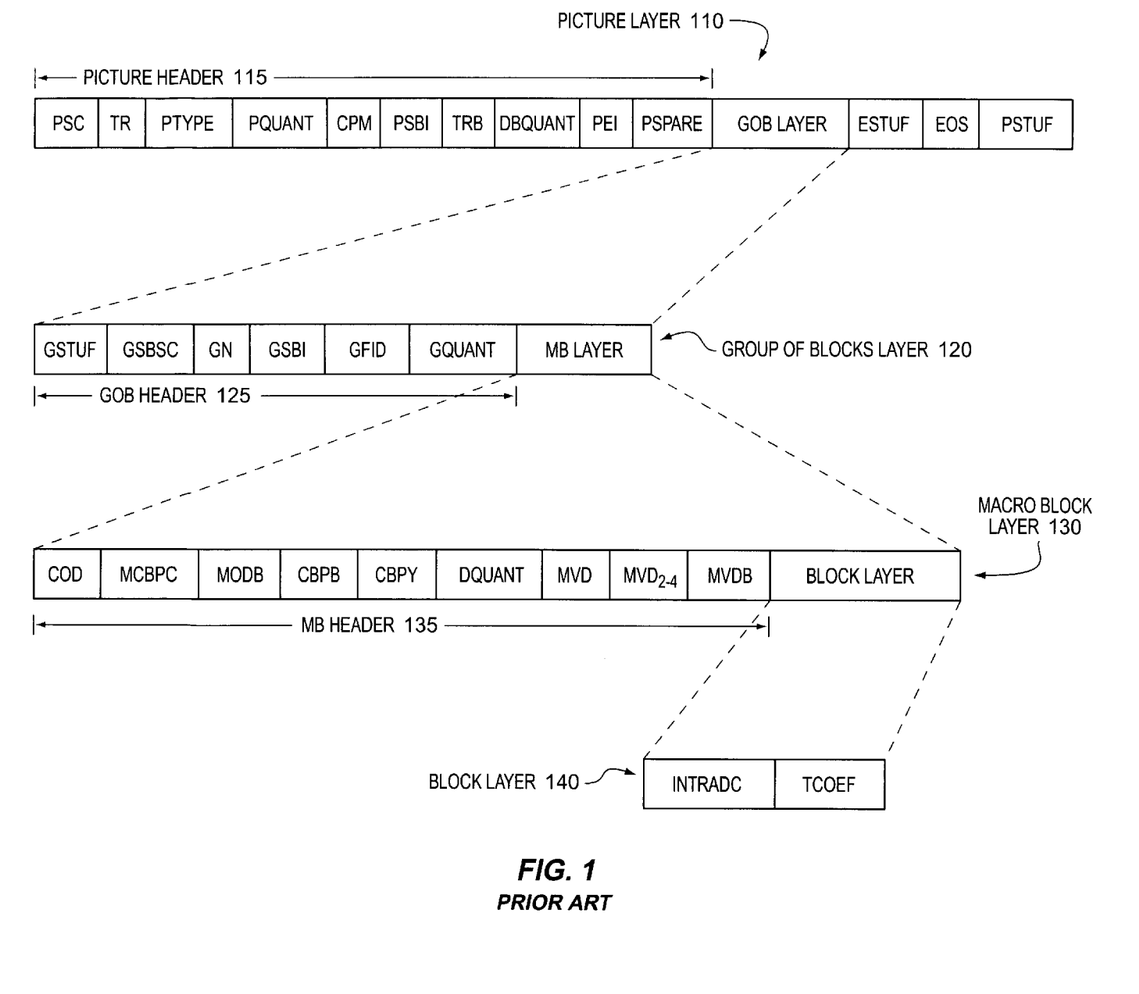
FIG. 1 is a diagram illustrating the layers used by H.263 to represent a picture in an encoded digital video bitstream.

FIG. 1 illustrates the layers used by H.263 to represent a picture in an encoded digital video bitstream. The Telecommunication Standardization Sector of the International Telecommunication Union (ITU-T) has specified a coded representation useful for compressing the moving picture portion of a low bitrate audio-visual service. This coded representation is described in Recommendation H.263 entitled "Video Coding For Low Bitrate Communication." Draft ITU-T Recommendation H.263, published 1995 (hereinafter H.263).

Only a brief description of the layers is presented here, as Recommendation H.263 fully describes the syntax for each layer. At the highest level, is a picture layer 110. Generally, an encoded picture includes a picture header 115, one or more Groups of Blocks in a Group of Blocks (GOB) layer, and an end of sequence (EOS) code. The picture header 115 includes, among other fields, a picture start code (PSC) field and a picture type (PTYPE) information field. These fields and their purpose are described in detail in Recommendation H.263.

The GOB layer 120 includes a GOB header 125 and a macroblock (MB) layer. The GOB header 125 includes optional stuffing bits, GSTUF, a GOB start code (GBSC), a GOB group number (GN), an optional GOB sub bitstream indicator (GSBI), a GOB frame identifier (GFID), and quantizer information (GQUANT).

The macroblock layer 130 includes a MB header 135 followed by block data in a block layer 140. At the lowest level, is the block layer 140. Each block includes an optional DC coefficient for INTRA blocks (INTRADC), and a variable length coded transform coefficient (TCOEF).

The five standardized picture formats are described below with reference to Table 1.

TABLE 1

Number of Pixels per Line and Number of Lines for each of the H.263 Picture Formats

| Picture Format | # Pixels for Lum | # Lines for Lum | # Pixels for Chro | # Lines for Chro | MBs per GOB |
|---|---|---|---|---|---|
| sub-QCIF | 128 | 96 | 64 | 48 | 8 |
| QCIF | 176 | 144 | 88 | 72 | 11 |
| CIF | 352 | 288 | 176 | 144 | 22 |
| 4CIF | 704 | 576 | 352 | 288 | 88 |
| 16CIF | 1408 | 1152 | 704 | 576 | 352 |

Table 1 shows the sampling structure for each of the five standardized picture formats. For example, a picture in Quarter Common Intermediate Format (QCIF) has 176×144 pixels for luminance and 88×72 pixels for chrominance. The last column of Table 1 indicates the number of macroblocks (MBs) per group of blocks (GOB) for each picture format. This number may be calculated using the pixel data in Table 1, the number of GOBs per picture, and the number of pixels in each MB. The number of GOBs per picture is defined by H.263 to be 6 for sub-QCIF, 9 for QCIF, and 18 for CIF, 4CIF and 16CIF. Each macroblock contains 16×16 pixels of luminance and 8×8 pixels of chrominance. To determine the number of MBs per GOB for a QCIF picture, the number of luminance pixels (176×144=25,344) is divided by the number of luminance pixels in each MB (16×16=256; 25,344/256=99). Subsequently, the number of MBs employed to encode the given picture format (99) is divided by the number of GOBs for the picture format (9) to determine the number of MBs per GOB for the particular picture format. For this example, the result is 11 MBs per GOB for QCIF pictures. From this example, it should be apparent that the spatial location of GOBs within the video bitstream, in this prior approach, is determined based upon the picture format. Thus, for each picture format, a GOB header can appear in the video bitstream only at certain predetermined spatial locations within the bitstream.

Figure 2A:
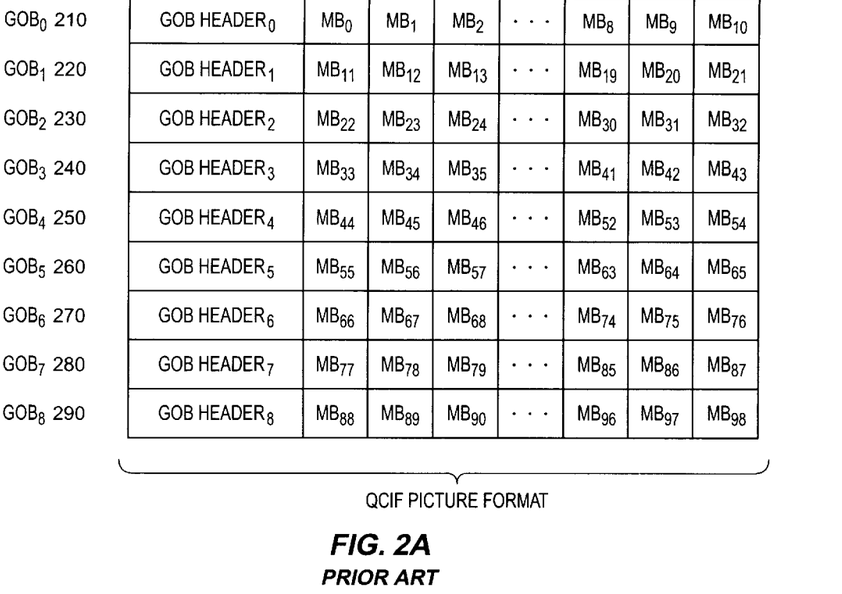
FIG. 2A is a diagram illustrating the arrangement of the Group of Blocks layer for a Quarter Common Intermediate Format (QCIF) picture.

Referring now to FIG. 2A, the GOB layer for a QCIF picture is depicted. As described above, the GOB layer for this particular picture format includes 9 GOBs (210–290), each including 11 macroblocks. This figure illustrates the inflexibility of this prior approach. As discussed earlier, GOB headers are only allowed at predetermined spatial locations in the video bitstream for a given picture format. For example, when encoding a QCIF picture, a GOB header can only appear after a multiple of 11 consecutive MBs as shown.

Figure 2B:
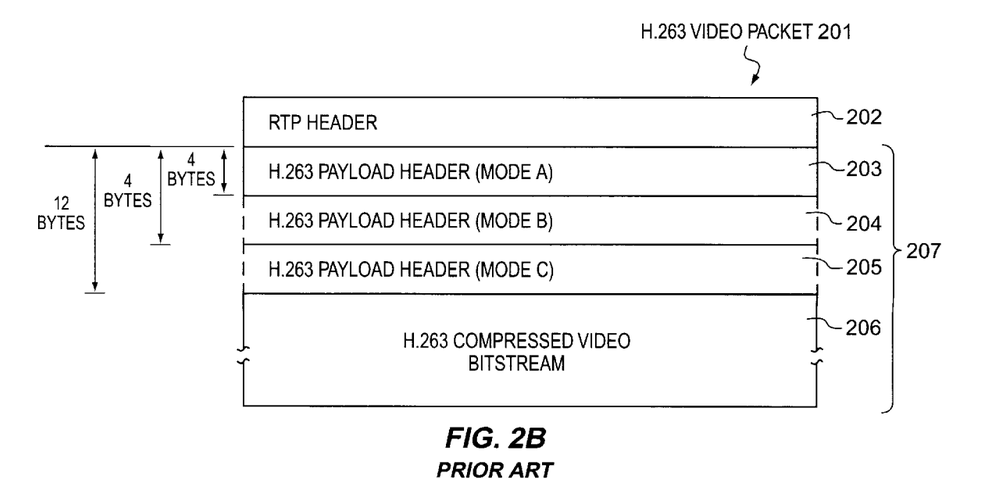
FIG. 2B is a diagram illustrating the structure of a H.263 video packet using a prior encapsulation approach.

FIG. 2B shows a H.263 video packet using a prior encapsulation approach and the prior layer structure shown in FIG. 1. The H.263 video packet 201 includes a Real-Time Transport Protocol (RTP) packet header 202 and a payload area 207. Further information regarding RTP may be found in H. Schulzrinne, S. Casner, R. Fredrick, V. Jacobson, "RTP: A Transport Protocol for Real-Time Application," RFC 1889, 1996. Using this prior approach, the payload area 207 of the H.263 video packet 201 also includes one of three H.263 payload headers, Mode A 203, Mode B 204, or Mode C 205. Finally, the H.263 compressed video bitstream 206 is included in the payload area 207 of the H.263 video packet 201.

In this prior approach, the shortest header mode (Mode A) is recommended for GOBs that are smaller than the network packet size. In this mode, a 4 byte payload header 203 is inserted prior to the H.263 compressed video bitstream. In this mode, each packet must start at the beginning of a GOB. That is, the H.263 bitstream is packetized only at GOB boundaries.

Modes B and C allow the H.263 bitstream to be fragmented at MB boundaries. However, extra information is employed at the start of a packet to recover the decoder internal state should a H.263 video packet 201 be lost during transmission. This extra information results in a size increase of the payload header from 4 bytes to 8–12 bytes. In this prior approach, modes B and C are recommended for transmitting GOBs whose sizes are larger than the maximum packet size allowed in the underlying protocol.

A number of disadvantages of the prior method exist within encapsulation. One limitation of the prior approach is that GOB headers are limited to predetermined spatial locations within the video bitstream. Further, while modes B and C allow fragmentation at MB boundaries, they do so at the expense of higher overhead.

In general, it is desirable to provide a more efficient method and apparatus for encapsulating and transmitting a video bitstream. More specifically, it is desirable to allow fragmentation of the video bitstream at MB boundaries with less overhead.

It is also desirable to jointly optimize the video bitstream layering and the process of segmenting the video bitstream into transport protocol packets. Specifically, it would be advantageous to provide a video bitstream syntax that allows dynamic insertion of synchronization information thereby creating a flexible video bitstream that may be efficiently packetized for a variety of transport protocols.

SUMMARY OF THE INVENTION

A method and apparatus for transmitting a video bitstream over a communication medium is disclosed. The video bitstream is carried as payload data within packets of a transport protocol by dynamically determining whether to fragment the video bitstream at a current macroblock. If no determination of fragmentation occurs, based upon the maximum transfer unit size of the transport protocol, the current macroblock is transmitted in a current transport protocol packet. However, if determination of fragmentation occurs, synchronization information and the current macroblock are transmitted in another transport protocol packet.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for transmitting a flexible and error resilient video bitstream is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown only in block diagram form.

Figure 3:
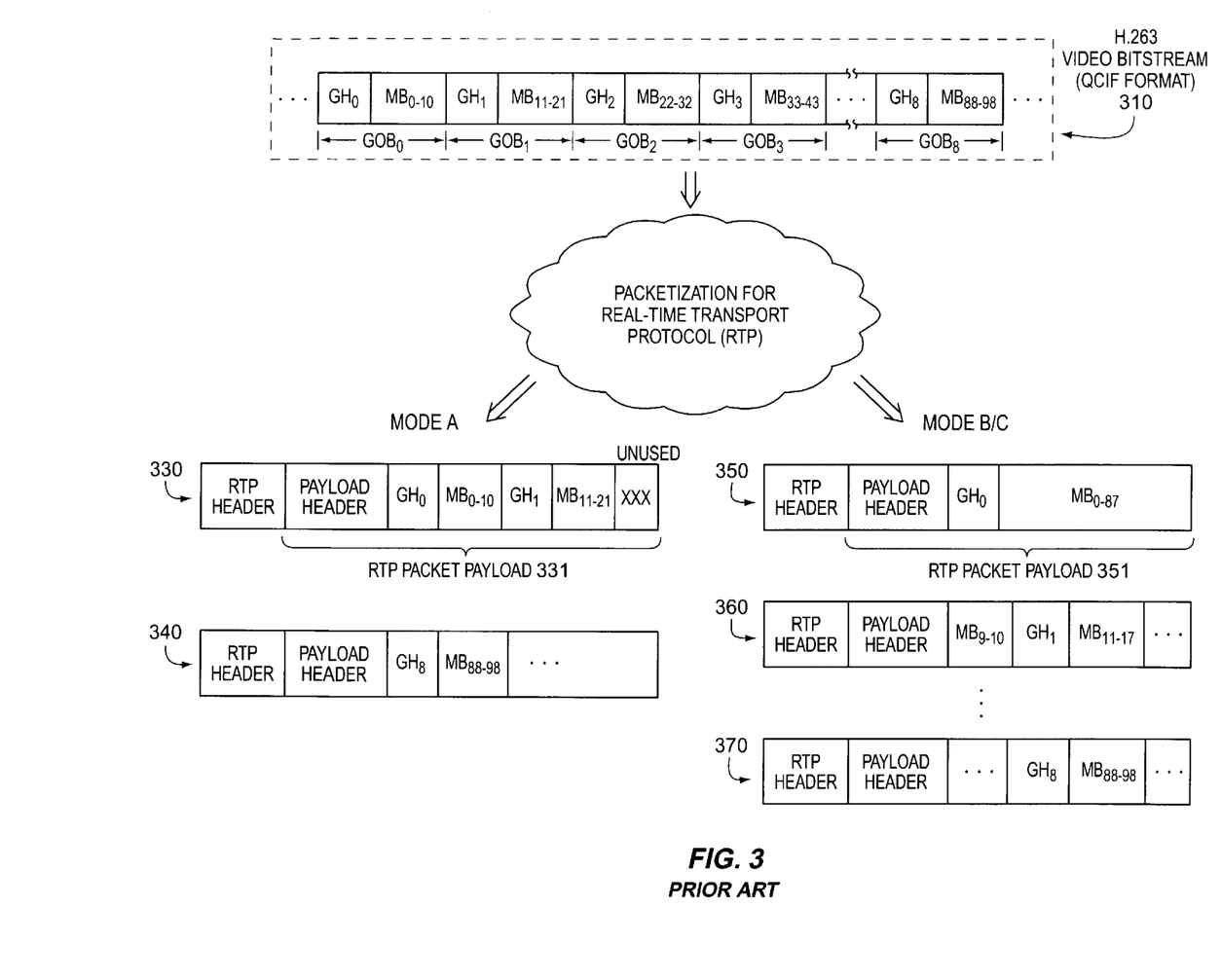
FIG. 3 is a diagram illustrating a prior approach of encapsulating a H.263 video bitstream in Real-Time Transport Protocol (RTP) packets.

FIG. 3 illustrates the prior approach of encapsulating a H.263 video bitstream in Real-Time Transport Protocol (RTP) packets. A H.263 video bitstream 310 is provided to a packetization process 320. Depending on the mode, the packetization process 320 will produce RTP packets with 4 byte payload payload headers or RTP packets with 8–12 byte headers.

The first example assumes the GOBs in the H.263 video bitstream 310 are smaller than the RTP packet size. In this example, the packetization process 320 will read data from the H.263 video bitstream 310 and produce RTP packets 330, 340, and other intermediate RTP packets (not shown). RTP packet 330 includes a RTP header and a RTP packet payload 331. As discussed above, in mode A, the payload area 331 of each transport protocol packet (here RTP packets) must begin with a 4 byte H.263 payload header and a GOB header ($GH_0$). Since this example assumes that the GOBs are smaller than the RTP packet size, there may be room in the RTP packet payload for multiple GOBs. In this example, RTP packet 330 is shown carrying 2 GOBs. The first GOB begins with GOB header, $GH_0$, and includes 11 macroblocks, $MB_{0-10}$. The second GOB begins with GOB header, $GH_1$ and includes 11 macroblocks, $MB_{11-21}$.

Now, an example assuming the GOBs in the H.263 video bitstream 310 are larger than the RTP packet size will be discussed. In this example, the packetization process 320 will read data from the H.263 video bitstream 310 and produce RTP packets 350, 360, 370, and other intermediate RTP packets (not shown). RTP packet 350 includes a RTP header and a RTP packet payload 351. As discussed above, in mode B and C, the payload area 351 of each transport protocol packet must begin with a H.263 payload header of 8 to 12 bytes and a GOB header ($GH_0$). RTP packet 350 is shown carrying less than one GOB. Here, no wasted bandwidth results from leaving portions of the RTP packet payload 351 unused. However, as will be seen, the fragmentation between MBs results in higher overhead in the form of larger payload headers. Since, for this example, we have assumed that the GOBs are larger than the RTP packet size, the GOB must be fragmented between macroblocks. Because the H.263 video bitstream is being fragmented between MBs in this example, some of the information from the GOB transmitted in packet 350 (e.g., quantizer information) must be duplicated into the next packet's H.263 payload header. This duplication of information is required in order to process subsequent macroblocks that have become separated from their GOB header in the event of packet loss. In this example, the macroblocks M $B_{9-10}$—cannot be decoded without the synchronization information contained in $GH_0$; therefore, at least a portion of the information in $GH_0$ must be duplicated into the H.263 payload header of RTP packet 360. Similar duplication will be necessary for RTP packet 370 and other intermediate packets not shown. The inefficiencies of this prior approach should now be clear.

HARDWARE OVERVIEW

Figure 4:
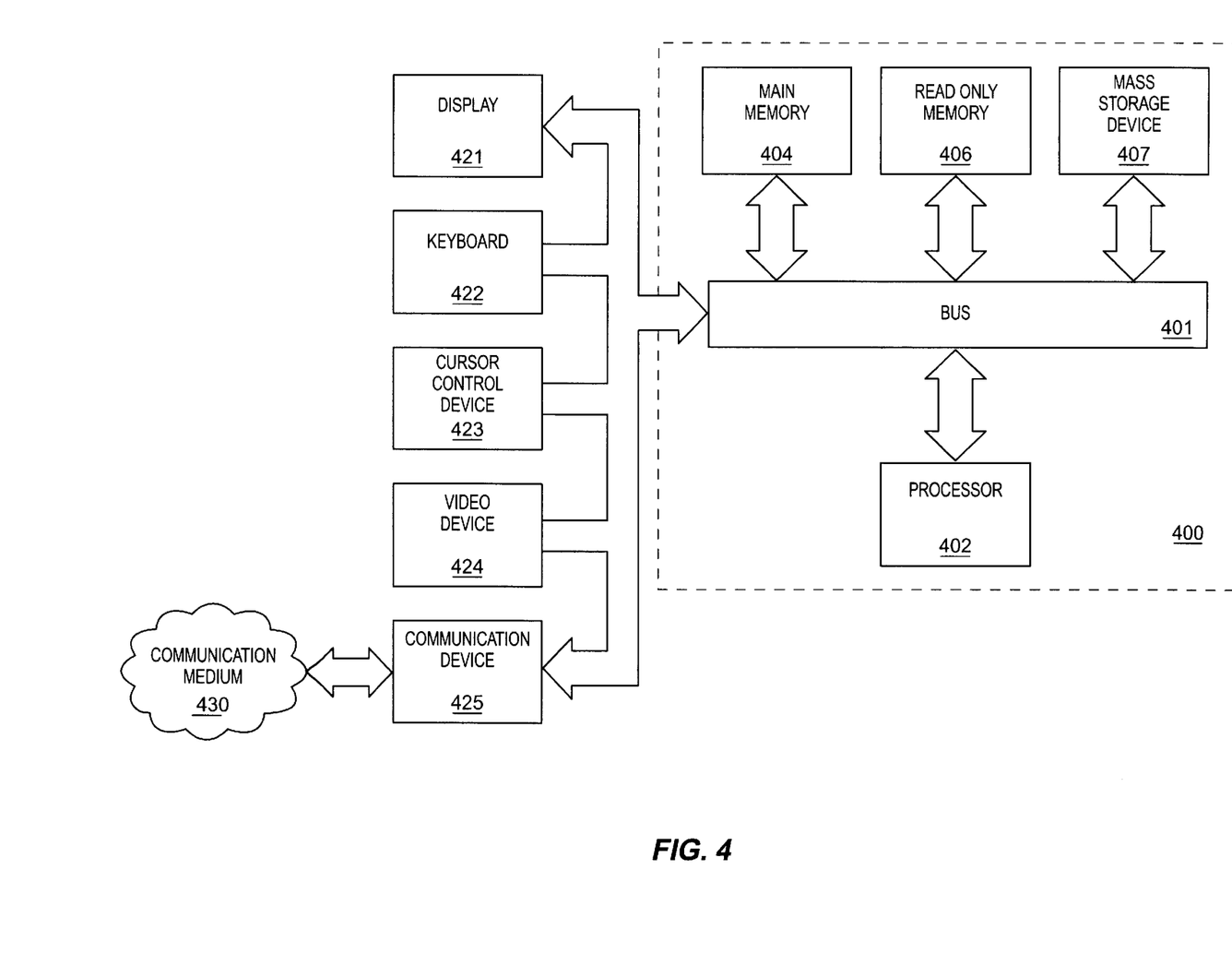
FIG. 4 is a block diagram of a typical computer system that may be employed to implement one embodiment of the present invention.

Referring to FIG. 4, a computer system is shown as 400. The computer system 400 represents a computer system which may implement an embodiment of the present invention. Computer system 400 comprises a bus or other communication means 401 for communicating information, and a processing means 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also comprises a read only memory (ROM) and/or other static storage device 406 coupled to bus 401 for storing static information and instructions for processor 402. Data storage device 407 is coupled to bus 401 for storing information and instructions. A data storage device 407 such as a magnetic disk or optical disc and its corresponding drive can be coupled to computer system 400. Computer system 400 can also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device is cursor control 423, such as a mouse, a trackball, or cursor direction keys for communicating direction information and command selections to processor 402 and for controlling cursor movement on display 421. This input device typically has two degrees of freedom in two axes, a first axis (e.g., x) and a second axis (e.g., y), which allows the device to specify positions in a plane. Alternatively, other input devices such as a stylus or pen can be used to interact with the display. A video device 424 may be coupled to bus 201 for providing video signals to the computer system 400. Further, a communication device 425 may be coupled to bus 401 for use in accessing other nodes of a distributed system via a network. The communication device 425 may include any of a number of commercially available networking peripheral devices such as those used for coupling to an Ethernet, token ring, Internet, or wide area network. The communication device 425 is coupled to a communication medium 430. The communication medium 430 may include any of a number of medium suitable for transmission and reception of data signals such as Ethernet, the Internet, POTS (plain old telephone service), and ISDN (Integrated Services Digital Network). Note that any or all of the components of the system illustrated in FIG. 2 and associated hardware may be used in various embodiments of the present invention; however, it will be appreciated by those of ordinary skill in the art that any configuration of the system may be used for various purposes according to the particular implementation.

This particular embodiment of the present invention is related to the use of computer system 200 for producing a coded video bitstream, encapsulating the coded video bitstream in packets of a transport protocol, and transmitting the resulting transport protocol packets over a communication medium 430. In this embodiment, computer system 200 executes a program resulting in the processor 202 encoding input video data signals and segment the coded video bitstream into packets of a given transport protocol for transmission by the communication device 425 over the communication medium 430.

Figure 5:
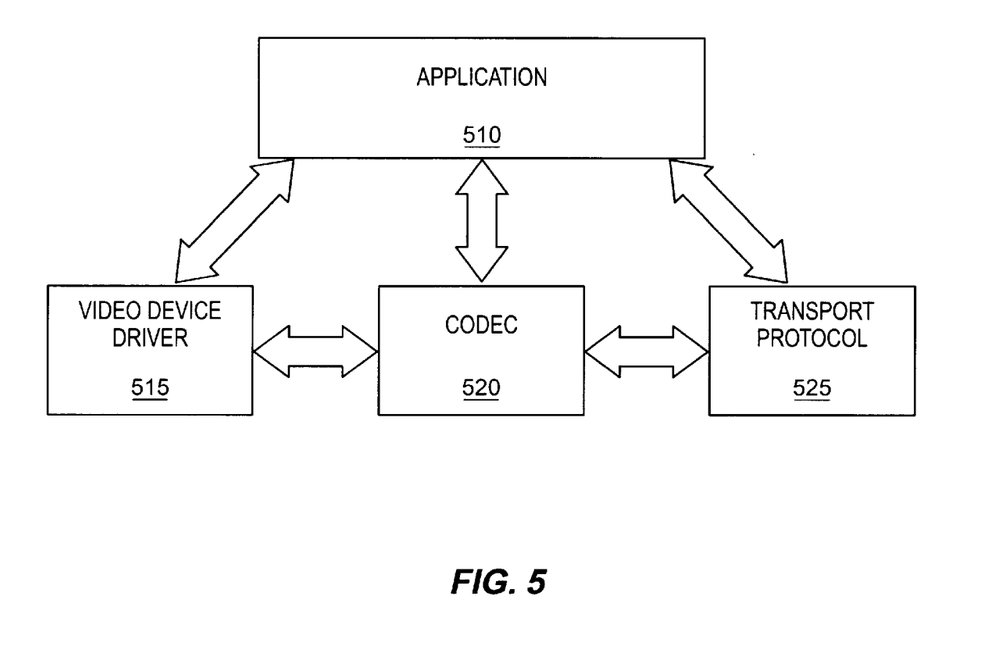
FIG. 5 is a block diagram of a software architecture according to one embodiment of the present invention.

FIG. 5 is an example of a software architecture according to one embodiment of the present invention. In this embodiment, an application 510 oversees the processing of a video device driver 515, an encoder/decoder (codec) 520, and a transport protocol. In this embodiment, the video device driver 515 receives video data from the video device 424. The application 510 reads the video data from the video device driver and commands the codec 520 to compress the video data. It is appreciated that the application 510 could also command the video device driver 515 to transfer the received video data to the codec 520 directly without having to both read the video data from the video device driver 515 and then transfer the video data to the codec 520. In any event, after the codec 520 completes the compression process, the coded video bitstream is segmented into appropriate size units for transmission by the transport protocol 525. While an embodiment will be described with respect to the Real-Time Transport Protocol (RTP), the present invention is not limited to any specific transport protocol.

Alternatively, in another embodiment, application 510 may not be employed. For example, the video device driver could simply send the received video data directly to the codec 520. Further, upon compressing the video data, the codec 520 could pass the coded video bitstream directly to the transport protocol for segmentation and transmission.

Figure 6:
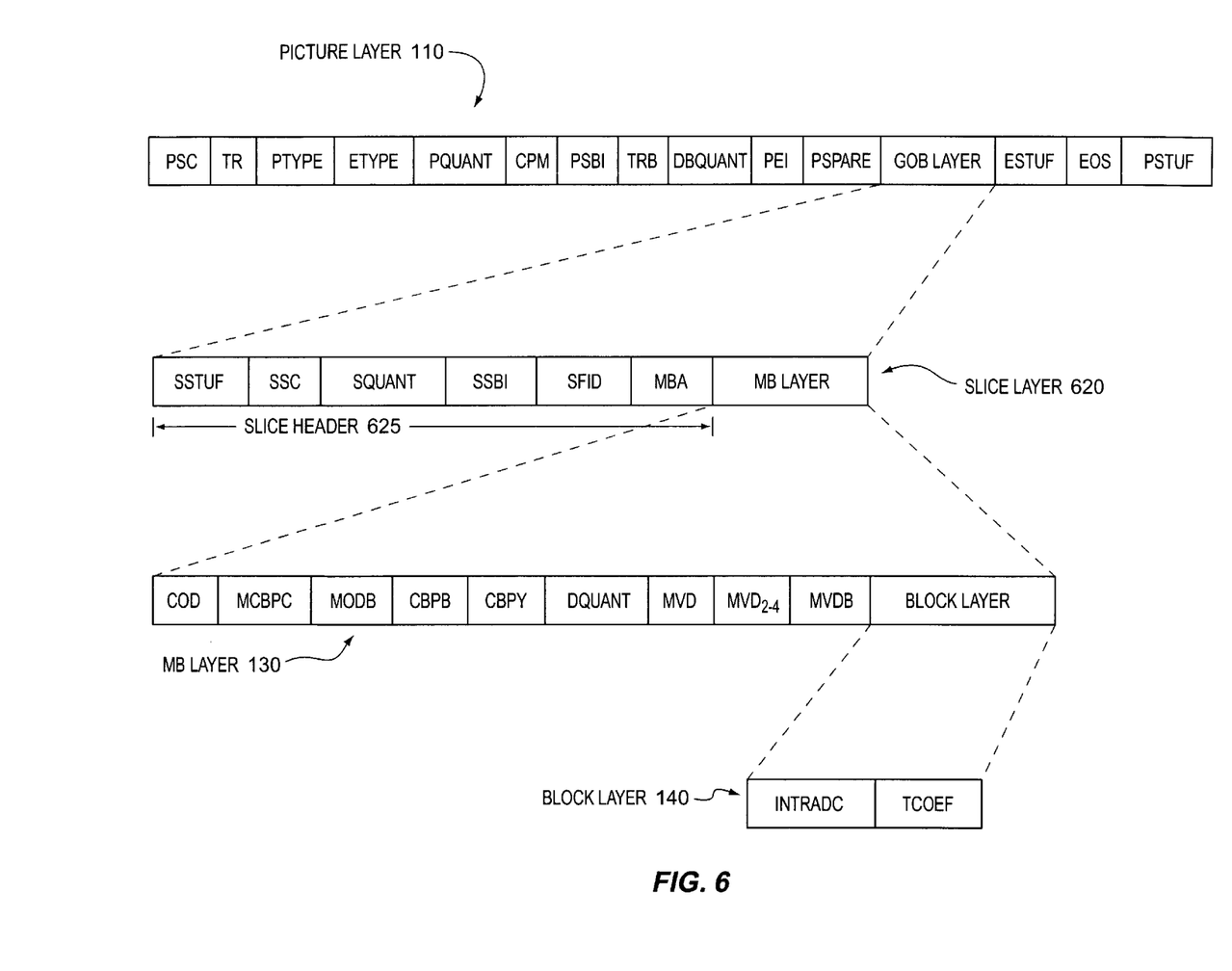
FIG. 6 is a diagram illustrating layers of H.263 employed to represent a picture in an encoded digital video bitstream according to one embodiment of the present invention.

FIG. 6 illustrates layers proposed for H.263 to represent a picture in an encoded digital video bitstream according to this embodiment of the present invention. In one embodiment, a slice layer 620 is used in place of the group of blocks layer 120 when the codec is operating in Slice Structured mode. The prior layered structure described with respect to FIG. 1 remains available when the codec is not in Slice Structured mode.

In this embodiment, the picture layer 110, the macroblock layer 130, and the block layer 140 remain the same as described above with reference to FIG. 1 and in Recommendation H.263, except that the use of the Slice Structured mode is indicated in an optional ETYPE field that follows the PTYPE field of the picture header. A flag in the ETYPE field tells the receiving computer system whether to expect GOB headers or slice headers.

The slice layer 620 includes a slice header 625 and a macroblock (MB) layer. The slice header 625 includes optional stuffing bits (SSTUF), a slice start code (SSC), a quantizer information field (SQUANT), an optional slice sub bitstream indicator (SSBI), a slice frame identifier (SFID), and a macroblock address (MBA).

SSTUF is a codeword of variable length comprising less than 8 bits. SSTUF byte aligns the start of the SSC codeword. Encoders may insert this codeword directly before an SSC codeword. The bit value 1 is used for stuffing within SSTUF.

SSC is a word of 17 bits having a value of 0000 0000 0000 0000 $1_b$. As discussed above, the slice start codes may or may not be byte aligned. Byte alignment can be achieved by inserting SSTUF before the SSC such that the first bit of the start code is the first (most significant) bit of a byte.

SQUANT is a fixed length codeword of 5 bits which indicates the quantizer to be used for the slice until it is updated by a subsequent DQUANT. In this embodiment the 5 bit codewords are the natural binary representations of the values of QUANT which, being half the step sizes, range from 1 to 31.

SSBI is a fixed length codeword of 2 bits that functions essentially the same as the GSBI codeword in H.263. The 2 bit codeword is only present if Continuous Presence Multipoint mode is indicated by the CPM field in the picture header 115. The codewords are the natural binary representation of the sub-bitstream number for the slice header and all following information until the next picture slice start code. Annex C of Recommendation H.263 contains additional information on Continuous Presence Multipoint (CPM).

SFID is a fixed length codeword of 2 bits that functions essentially the same as the GFID codeword in H.263. In this embodiment, SFID has the same value in every slice header of a given picture. Moreover, if PTYPE as indicated in a picture header is the same as for the previous transmitted picture, SFID will have the same value as in that previous picture. However, if PTYPE in a certain picture header differs from the PTYPE in the previous transmitted picture header, the value for SFID in that picture should differ from the value in the previous picture.

MBA is a codeword of 10 to 14 bits, depending on the source picture format (e.g., sub-QCIF, QCIF, CIF, 4CIF, or 16CIF). The bits are the binary representation of the macroblock number of the first macroblock in the current slice. The macroblock number is relative to the beginning of the picture and is incremented in scanning order. Therefore, MBA uniquely identifies which macroblock in the picture is the first macroblock of the current slice.

For source picture formats having fewer than 1024 macroblocks (e.g., sub-QCIF, QCIF, and CIF), 10 bits are used for MBA; 11 bits are used if there are at least 1024 macroblocks and fewer than 2048; 12 bits are used if there are at least 2048 macroblocks and fewer than 4096; 13 bits are used if there are at least 4096 macroblocks and fewer than 8192; and 14 bits are used if there are 8192 or more macroblocks. Of course, it is appreciated that more bits may be required to represent the macroblock address for future picture formats.

When a slice starting with macroblock number 0 is transmitted first for a picture, the slice header including SSTUF, SSC, SQUANT, SSBI, SFID, and MBA is empty. Instead, the PSC is used when the slice starting with macroblock number 0 is transmitted. If the first slice being transmitted does not begin with macroblock number 0 (e.g., an out-of-order slice), then a slice header should be used.

Figure 7:
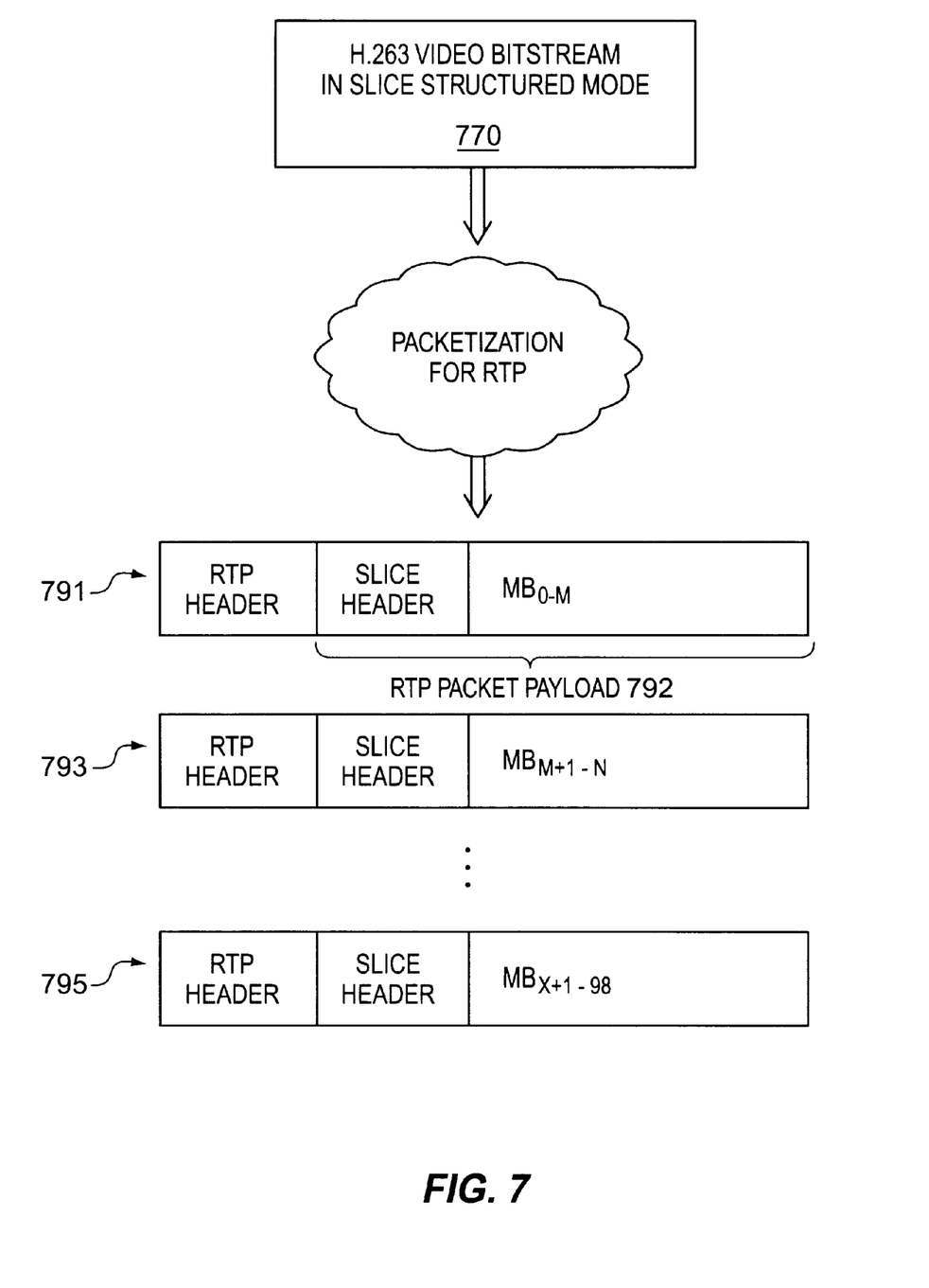
FIG. 7 is a diagram illustrating a method of encapsulating a H.263 video bitstream in Real-Time Transport Protocol (RTP) packets according to one embodiment of the present invention.

FIG. 7 illustrates a method of encapsulating a H.263 video bitstream in Real-Time Transport Protocol (RTP) packets according to one embodiment of the present invention. A H.263 video bitstream in slice structured mode 770 is provided a packetization process for RTP. For the sake of example, the H.263 video bitstream is assumed to be representing a compressed QCIF picture.

The H.263 video bitstream uses the layered structure shown in FIG. 6. The RTP packetization process 780 segments the H.263 video bitstream into RTP packets 791, 793, 795, and other intermediate RTP packets (not shown). RTP packet 791 includes a RTP header and a RTP packet payload 792. The RTP packet payload 792 includes a slice header and a group of M+1 consecutive macroblocks (typically as many MBs as the RTP packet payload 792 will accommodate), shown here as $MB_0$-M. The next RTP packet 793 will also include a RTP header and a slice header. The first macroblock in the next RTP packet 793 is $MB_{M+1}$ and the packet will contain macroblocks numbered M+1 through N. Intermediate RTP packets, not shown, will carry macroblocks N+1 through X. Finally, the last of the macroblocks for the QCIF picture will be carried in the payload of RTP packet 795. RTP packet 795 also has a RTP header and a slice header followed by a group of consecutive macroblocks, $MB_{X+1-98}$.

As may now be observed with reference to RTP packets 791, 793, and 795, each packet has a slice header for synchronizing the decoder without the additional overhead of mode B or mode C H.263 payload headers. Further, since the slice headers now contain a macroblock address codeword, the received video packets can be decoded in the order received.

The video bitstream of this embodiment of the present invention provides better support for packetization over packet-switched networks by providing a more flexible technique of synchronization. The addition of the slice layer 620 allows dynamic synchronization at RTP packet boundaries. Of course, it is appreciated that the flexibility of the slice layer 620 has application beyond RTP. Because the synchronization information in the slice headers is no longer constrained to predefined spatial locations in the video bitstream, synchronization may be achieved at packet boundaries of any given transport protocol.

In a simulation using the slice structured mode described herein, the overhead of slice headers at various data rates and network maximum transfer unit (MTU) sizes was measured against the overhead of using GOB headers, and H.263 payload headers (mode A and mode B). The simulation was run with different data rates and frame rates with the following test sequences: QCIF news, CIF news, and CIF foreman. Upon, examining the results of the simulation, shown in Table 2, Table 3, and Table 4, the conclusion is that the use of slice headers significantly reduces overhead in the cases simulated compared with the prior encapsulation methods.

Table 2 and Table 3 as provided in appendix A.

Table 4 as provided in appendix A.

Figure 8A:
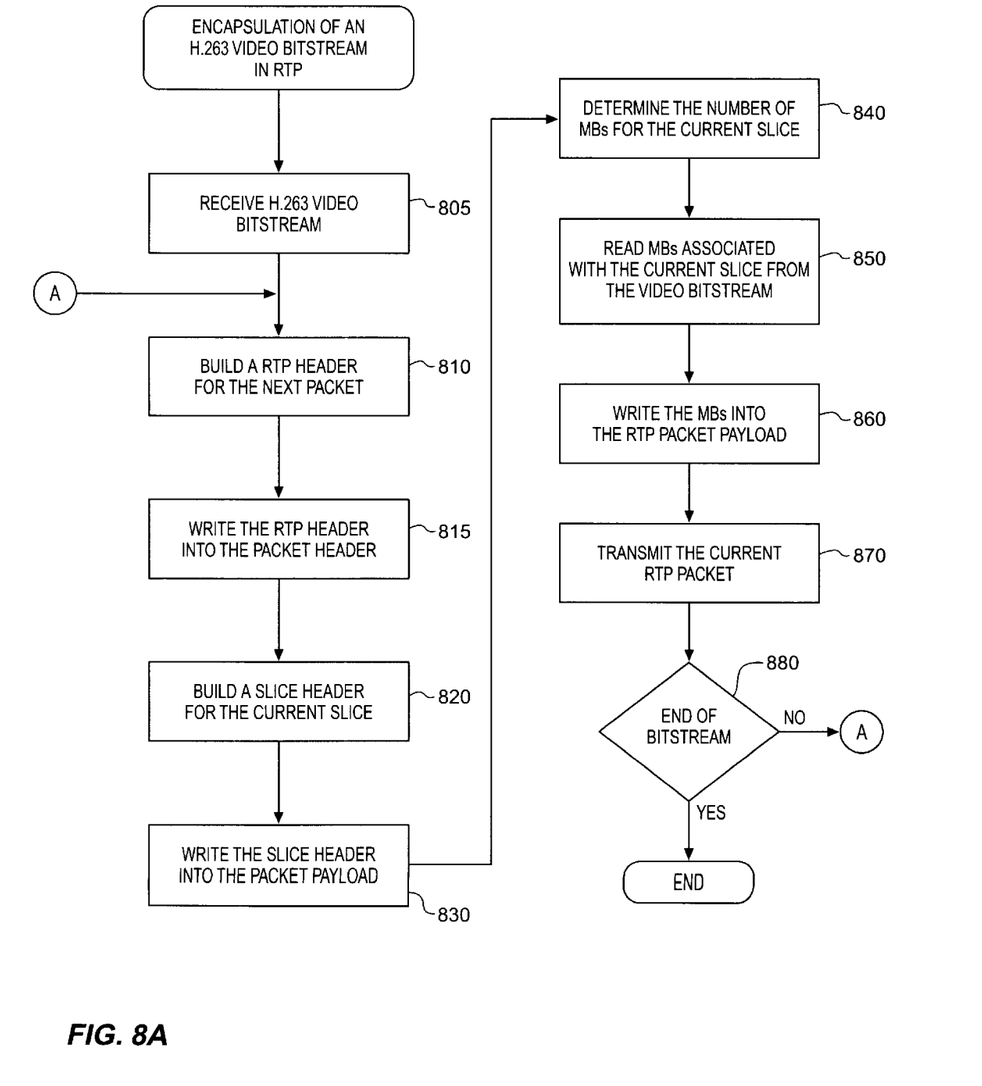
FIG. 8A is a flow diagram illustrating a method of encapsulating a H.263 video bitstream according to one embodiment of the present invention.

FIG. 8A is a flow diagram illustrating a method of encapsulating a H.263 video bitstream according to one embodiment of the present invention. The video bitstream is encapsulated and carried as payload data within packets of a transport protocol so the video bitstream may be transmitted over a communication medium. Importantly, in this embodiment, synchronization information is not inserted at predetermined spatial locations in the video bitstream based upon the picture format. Rather, the determination of where to fragment the video bitstream is a function of the transport protocol.

At step 805, the H.263 video bitstream is received from the codec. Transport protocol headers are employed for each transport protocol packet. Here, an RTP header is assembled for the next RTP packet at step 810. The RTP header may be predefined or it may be dynamically assembled during the encapsulation process. In any event, at step 815, the RTP header is written into the header of the transport protocol packet.

Slice headers are assembled and inserted into the video bitstream. This may be performed by the codec or the packetization process. At step 820, the slice header for the current group of macroblocks is built. At step 830, the slice header is written into the packet payload area. In this embodiment, the slice header appears before any of the macroblocks in the payload.

As discussed earlier, the number of macroblocks per slice is based upon the transport protocol rather than the picture format. In one embodiment, the number of macroblocks per slice is dynamically determined based upon the maximum transfer unit size of the transport protocol. At any rate, the number of macroblocks for the current slice is determined at step 840, based upon the transport protocol.

The macroblocks associated with the current slice are read from the video bitstream at step 850. At step 860, the macroblocks associated with the current slice are written into the RTP packet payload. After having written the transport protocol header, the slice header, and the macroblocks associated with the current slice into the RTP packet, the packet is transmitted over the communication medium at step 870.

At step 880, it is determined whether the end of the bitstream has been reached. If this is not the end of the bitstream, processing continues with step 810. That is, the above steps are repeated starting at step 810 until the entire bitstream has been encapsulated and transmitted.

Figure 8B:
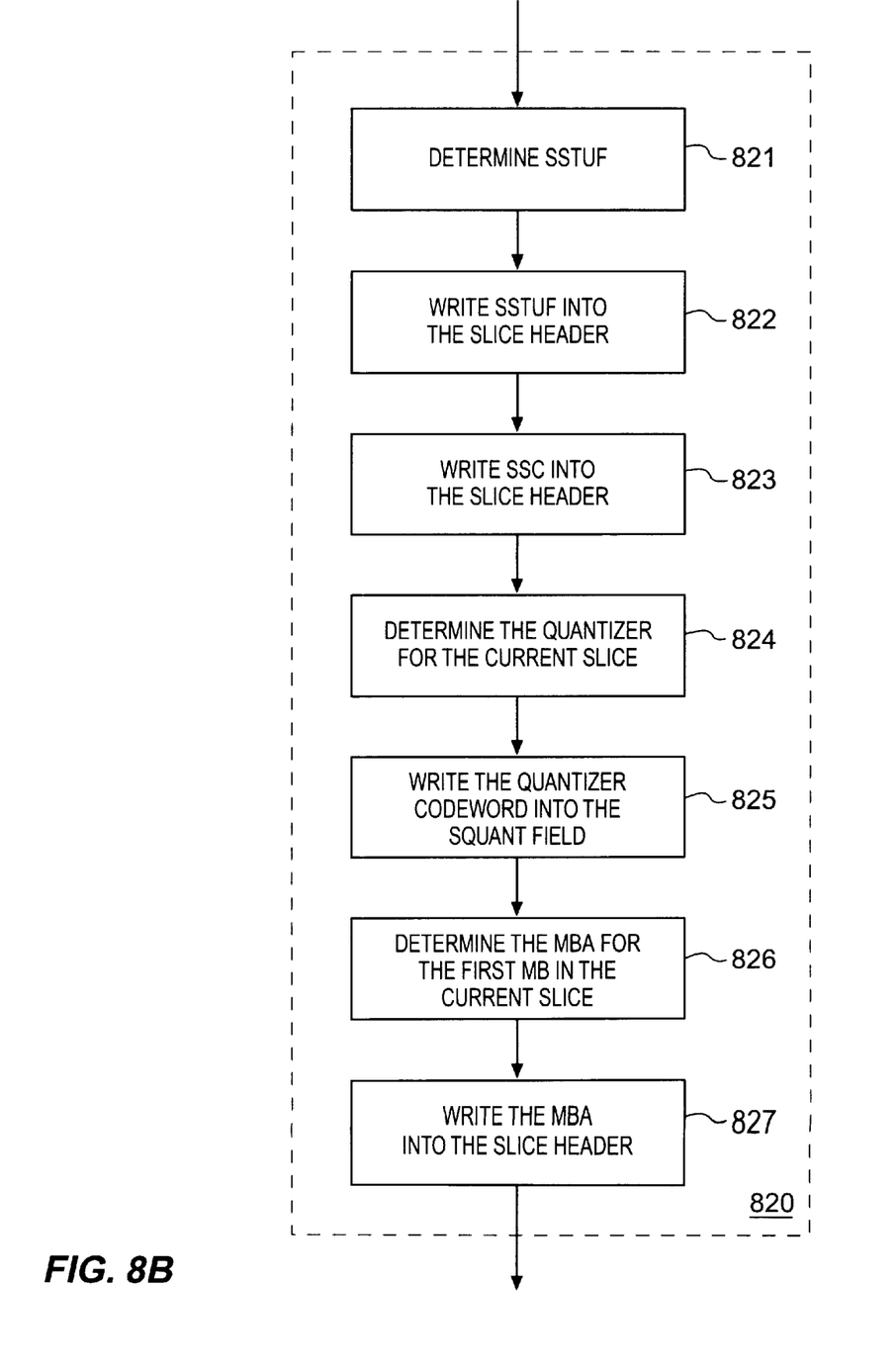
FIG. 8B is a flow diagram illustrating a method of building a slice header for a H.263 video bitstream according to one embodiment of the present invention.

FIG. 8B is a flow diagram illustrating a method of building a slice header for a H.263 video bitstream according to one embodiment of the present invention. In one embodiment, step 820, above, further includes the steps described hereafter. At step 821, the number of stuff bits to be employed is determined. As discussed earlier, stuff bits are optional. However, if they are inserted into the slice header, they assist in byte aligning the slice start code.

At step 822, if the SSTUF codeword is used, it is written into the slice header. Following the SSTUF codeword is the slice start code (SSC). SSC is inserted into the slice header at step 823.

The decoding apparatus employs information regarding which quantizer to use for inverse quantization of the macroblocks within the current slice. Therefore, at step 824, the quantizer used by the codec for the current slice of macroblock is determined. At step 825, a codeword representing the quantizer, SQUANT, is written into the slice header.

In order to facilitate our-of-order decoding, a macroblock address is employed in the video packet to identify the spatial location of the first macroblock of the slice. At step 826, the macroblock address (MBA) for the first macroblock in the current slice is determined. Then, at step 827, the MBA is written into the slice header.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of transmitting a video bitstream over a communication medium, the video bitstream including a plurality of macroblocks, the method comprising:

representing the video bitstream as a hierarchical structure of layers including a picture layer, a slice layer, and a macroblock layer;

receiving a current macroblock of the plurality of macroblocks for transmission over the communication medium by way of a Real-Time Transport Protocol;

determining whether to start a new slice in the slice layer based upon the size of a current slice and a predetermined packet size associated with the Real-Time Transport Protocol;

if a determination to start a new slice occurs, then creating a new slice including a slice header containing synchronization information identifying the location of the current macroblock within a current picture of the picture layer, fragmenting the video bitstream between the current macroblock and a previous macroblock by associating the previous macroblock with the current slice and associating the current macroblock with the new slice, and transmitting the current macroblock and the previous macroblock as payload data of two different Real-Time Transport Protocol packets;

associating the current macroblock and the previous macroblock with the current slice and transmitting the current macroblock and the previous macroblock in the payload of a common transport protocol packet if a determination to start a new slice does not occur.

2. The method of claim 1 wherein the video bitstream is compatible with Recommendation H.263.

3. The method of claim 1, wherein the synchronization information also allows a decoding apparatus to remain synchronized in the event of Real-Time Transport Protocol packet lossage or out-of-order reception.

4. A computer system including a memory, and a processor coupled to the memory, the processor configured to transmit an input video bitstream over a communication medium via a Real-Time transport protocol (RTP), the memory having stored therein sequences of instructions which, when executed by the processor, cause the processor to:

in a first mode, transform the input video bitstream into a H.263-like video bitstream, the H.263-like video bitstream arranged in a hierarchical structure of layers including a picture layer, a group of blocks layer, and a macroblock layer, each group of blocks in the group of blocks layer including synchronization information at predetermined spatial locations, and in a second mode, transform the input video bitstream into a H.263-like video bitstream, the H.263-like video bitstream including the picture layer, the macroblock layer, and a slice layer in place of the group of blocks layer, the slice layer having a plurality of slices, each slice in the plurality of slices beginning at a location dynamically determined during packetization based upon one or more characteristics of the RTP, one characteristic of each slice being the size of an RTP packet, each slice in the plurality of slices including a slice header followed by a plurality of macroblocks in the macroblock layer, the slice header including synchronization information that identifies the location of the first of the plurality of macroblocks relative to the beginning of a current picture of the picture layer, wherein the size of most of the slices of the plurality of slices is substantially the same size as a payload size of the RTP packet.

5. A computer system including a memory, and a processor coupled to the memory, the processor configured to transmit an input video bitstream comprising a plurality of macroblocks over a communication medium via a transport protocol, the memory having stored therein sequences of instructions which, when executed by the processor, cause the processor to:

represent the video bitstream as a hierarchical structure of layers including a picture layer, a slice layer, and a macroblock layer;

receive a current macroblock of the plurality of macroblocks for transmission over the communication medium by way of a transport protocol;

determine whether to start a new slice in the slice layer based upon the size of a current slice and a predetermined packet size associated with the transport protocol;

if a determination to start a new slice occurs, then create a new slice including a slice header containing synchronization information identifying the location of the current macroblock within a current picture of the picture layer, each slice including a slice header and one or more macroblocks of the plurality of macroblocks, the slice header including synchronization information identifying the location within a picture of the first of the one or more macroblocks in the slice; and separately transport each slice of the plurality of slices as payload data in a transport protocol packet.

6. A machine-readable medium having stored thereon data representing sequences of instructions, and the sequences of instructions which, when executed by a processor, cause the processor to:

represent the video bitstream as a hierarchical structure of layers including a picture layer, a slice layer, and a macroblock layer;

receive a current macroblock of the plurality of macroblocks for transmission over the communication medium by way of a Real-Time Transport Protocol;

determine whether to start a new slice in the slice layer based upon the size of a current slice and a predetermined packet size associated with the Real-Time Transport Protocol;

if a determination to start a new slice occurs, then create a new slice including a slice header containing synchronization information identifying the location of the current macroblock within a current picture of the picture layer, fragment the video bitstream between the current macroblock and a previous macroblock by associating the previous macroblock with the current slice and associating the current macroblock with the new slice, and transmit the current macroblock and the previous macroblock as payload data of two different Real-Time Transport Protocol packets;

associating the current macroblock and the previous macroblock with the current slice and transmitting the current macroblock and the previous macroblock in the payload of a common transport protocol packet if a determination to start a new slice does not occur.

* * * * *

UNITED STATES PATENT AND TRADEMARK OFFICE
CERTIFICATE OF CORRECTION

PATENT NO. : 6,154,780
DATED : November 25, 2000
INVENTOR(S) : Chunrong Zhu

It is certified that error appears in the above-identified patent and that said Letters Patent is hereby corrected as shown below:

Title page,
Item [57], ABSTRACT,
Line 5, delete "at current" and insert -- at a current --.

Column 2,
Lines 64-65, delete "In this mode," and insert -- Importantly, in this mode --.

Column 3,
Line 37, delete "if determination" and insert -- if a determination --.

Column 4,
Line 26, delete "a packetization" and insert -- packetization --.
Lines 27-28, delete "4 byte payload payload headers" and insert -- 4 byte payload headers --.
Lines 28-29, delete "8-12 byte headers" and insert -- 8-12 byte payload headers --.

Column 5,
Line 3, delete "M B$_{9-10}$ – cannot be decoded" and insert -- MB$_{9-10}$ cannot be decoded --.

Column 7,
Line 57, delete "provided a packetization" and insert -- provided to a packetization --.

Column 8,
Line 15, delete "macroblock address" and insert -- MBA --.
Line 42, replace Table 2 and Table 3, in their entirety and insert in place therefor -- Table 2 and Table 3 as shown below:

QCIF News

| Bitrate (kbps) | MTU (bytes) | Fps | Slice Headers/ Frame | Slice Header Overhead | GOB Header Overhead | Payload Header Mode A | Payload Header Mode B | Total Overhead Mode A | Total Overhead Mode B |
|---|---|---|---|---|---|---|---|---|---|
| 18 | 64 | 5.65 | 6.70 | 7.15% | 8.19% | 18.93% | 25.66% | 27.12% | 33.85% |
| 18 | 128 | 5.63 | 3.00 | 3.19% | 8.16% | 8.45% | 11.45% | 16.61% | 19.61% |
| 18 | 256 | 5.60 | 1.00 | 1.06% | 8.12% | 2.80% | 3.80% | 10.92% | 11.92% |
| 18 | 512 | 5.58 | 0.00 | 0.00% | 8.09% | 0.99% | 1.98% | 9.08% | 10.07% |
|  | >512 | 5.58 | 0.00 |  |  |  |  |  |  |

Table 2

UNITED STATES PATENT AND TRADEMARK OFFICE
CERTIFICATE OF CORRECTION

PATENT NO. : 6,154,780
DATED : November 25, 2000
INVENTOR(S) : Chunrong Zhu

It is certified that error appears in the above-identified patent and that said Letters Patent is hereby corrected as shown below:

Column 8, cont'd,

CIF News

| Bitrate (kbps) | MTU (bytes) | Fps | Slice Headers/ Frame | Slice Header Overhead | GOB Header Overhead | Payload Header Mode A | Payload Header Mode B | Total Overhead Mode A | Total Overhead Mode B |
|---|---|---|---|---|---|---|---|---|---|
| 56 | 64 | 10.52 | 10.70 | 6.83% | 9.81% | 18.09% | 24.52% | 27.90% | 34.33% |
| 56 | 128 | 10.55 | 4.90 | 3.14% | 9.83% | 8.31% | 11.26% | 18.14% | 21.09% |
| 56 | 256 | 10.59 | 2.10 | 1.35% | 9.87% | 3.57% | 4.84% | 13.44% | 14.71% |
| 56 | 512 | 10.52 | 1.00 | 0.64% | 9.81% | 1.69% | 2.29% | 11.50% | 12.10% |
|  | >512 | 10.55 | 0.00 |  |  |  |  |  |  |

Table 3

Line 43, replace Table 4 in its entirety and insert in place thereof Table 4 as shown below:

CIF Foreman

| Bitrate (kbps) | MTU (bytes) | Fps | Slice Headers/ Frame | Slice Header Overhead | GOB Header Overhead | Payload Header Mode A | Payload Header Mode B | Total Overhead Mode A | Total Overhead Mode B |
|---|---|---|---|---|---|---|---|---|---|
| 224 | 64 | 4.81 | 109.00 | 7.96% | 1.12% | 21.07% | 28.56% | 23.19% | 29.68% |
| 224 | 128 | 4.66 | 52.40 | 3.71% | 1.09% | 9.81% | 13.30% | 10.90% | 14.39% |
| 224 | 256 | 4.68 | 24.30 | 1.73% | 1.09% | 4.57% | 6.19% | 5.66% | 7.28% |
| 224 | 512 | 4.66 | 11.60 | 0.82% | 1.09% | 2.17% | 2.94% | 3.26% | 4.03% |
| 224 | 1024 | 4.66 | 5.50 | 0.39% | 1.09% | 1.03% | 1.40% | 2.12% | 2.49% |
|  | >1024 | 4.66 | 0.00 |  |  |  |  |  |  |

Table 4

Column 11,
Lines 12-20, delete

```
"each slice including a slice header and one or more
macroblocks of the plurality of macroblocks, the slice
header including synchronization information identifying
the location within a picture of the first of the one or
more macroblocks in the slice; and
 separately transport each slice of the plurality of slices
   as payload data in a transport protocol packet."
```

UNITED STATES PATENT AND TRADEMARK OFFICE
CERTIFICATE OF CORRECTION

PATENT NO.    : 6,154,780
DATED         : November 25, 2000
INVENTOR(S)   : Chunrong Zhu It is certified that error appears in the above-identified patent and that said Letters Patent is hereby corrected as shown below:

<u>Column 11, cont'd,</u>
Lines 12-20, and insert --

```
fragment the video bitstream between the current macroblock
   and a previous macroblock by associating the previous
   macroblock with the current slice and associating the
   current macroblock with the new slice, and
transmit the current macroblock and the previous macroblock
   as payload data of two different Real-Time Transport
   Protocol packets;
associate the current macroblock and the previous
   macroblock with the current slice and transmitting the
   current macroblock and the previous macroblock in the
   payload of a common transport protocol packet if a
   determination to start a new slice does not occur.--
```

Signed and Sealed this

Second Day of September, 2003

JAMES E. ROGAN
*Director of the United States Patent and Trademark Office*